United States Patent Office 3,717,997
Patented Feb. 27, 1973

3,717,997
METHOD FOR OPERATING HYBRID ENGINES
Orval E. Ayers and Chester W. Huskins, Huntsville, Ala., assignors to the United States of America as represented by the Secretary of the Army
No Drawing. Filed Dec. 23, 1963, Ser. No. 333,240
Int. Cl. C06d 5/10
U.S. Cl. 60—220                    8 Claims The invention described herein may be manufactured and used by or for the Government for governmental purposes without the payment of any royalty thereon.

This invention relates generally to a method for operating a rocket engine and to oxidizer solutions to be used in these engines. Particularly this invention relates to an improved method of operating a hybrid-propellant rocket engine and to oxidizer solutions used in this improved method.

Most rocket engines now in use are based on either a solid or liquid propellant system. However, at the present time there is an interest in what is commonly referred to as the "hybrid" or "hybrid-propellant" rocket engine, the fuel is a solid grain rigidly positioned in the combustion chamber while the oxidizer necessary to sustain combustion is introduced into the chamber in the form of a fluid, usually a liquid. Thus, the hybrid-propellant rocket engine combines characteristics of both the solid and liquid fueled engines.

One particular advantage of the hybrid-propellant engine is that by controlling the rate of flow of the fluid oxidizer into the combustion chamber, the thrust of the engine can be varied. Normally, in the conventional solid propellant engine, the oxidizer and fuel are bound together as a single grain and once combustion is initiated, there is no practical means for altering the thrust except by regulating the size of the nozzle, a difficult task at best. However, altering the flow of a fluid oxidizer is a relatively simple task and it is currently done in almost every liquid propellant rocket engine.

The present invention concerns an improved method for operating hybrid-propellant engines generally and to oxidizers for use in the improved method. According to the instant invention, an oxidizer consisting essentially of a mixture of chlorine pentafluoride and at least one perhalogenyl fluoride is used as the oxidizer in the operation of hybrid-propellant engines. Since this mixture contains both fluorine and oxygen, it really oxidizes any of the conventional solid fuels now used in rocket engines and, therefore, the improved method of the invention is adaptable for use with hybrid engines using any solid fuel. However, preferred fuel and oxidizer combinations for use in hybrid engines are discussed hereinafter.

It will be apparent to those skilled in the art that the oxidizer compositions of the invention are readily usable as oxidizers in liquid propellant rocket engines in the same manner as other conventional liquid oxidizers. Therefore, the chlorine pentafluoride-perhalogenyl fluoride mixtures are not limited to use with hybrid-propellant engines.

In accordance with the foregoing, it is an object of the present invention to provide an improved method for operating hybrid-propellant reaction motors.

Another object of the invention is to provide a superior oxidizer for rocket fuels.

A further object of the instant invention is to provide an improved method for operating a hybrid-propellant rocket engine through the use of a superior oxidizer.

A still further object is to provide an improved method for operating hybrid-propellant rocket engines through the use of certain combinations of oxidizers and fuels.

The manner in which these as well as other objects can be accomplished will become apparent from the following detailed description.

Chlorine pentafluoride, $ClF_5$, is a relatively new liquid chemical reagent having a boiling point of about $-18°$ C. The compound is readily produced according to either of the following methods:

(1) Chlorine and excess fluorine can be directly reacted under pressure to produce about a 35% yield of $ClF_5$.

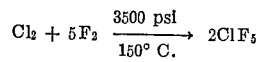

(2) Chlorine trifluoride and excess fluorine can be directly reacted at high pressure to produce about a 75% to 80% yield of $ClF_5$.

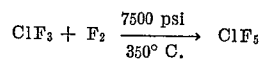

The use of chlorine pentafluoride in combination with perchloryl fluoride (or some other perhalogenyl fluoride) as an oxidizer for liquid propellant rocket engines or hybrid-fueled rocket engines increases the specific impulse of the engine over that obtained with similar oxidizers such as mixtures of perchloryl fluoride and chlorine trifluoride. The weight ratio of chlorine pentafluoride to perhalogenyl fluoride in the oxidizer composition contemplated by the present invention will vary from about 1.0:10.0 to about 10.0:1.0 although generally the mixture will consist of at least 25% by weight chlorine pentafluoride or a weight ratio of 1.0:3.0. Mixtures containing a weight ratio of chlorine pentafluoride to perhalogenyl fluoride of about 1.0:6.0 have been found to be especially valuable as oxidizers.

It will be apparent to those skilled in the art that the term "mixture" as used with the present invention is inclusive of solutions since the ingredients of the oxidizer mixture appear to be miscible in all proportion. Further more, as with many high energy liquid oxidizers, the present oxidizer mixtures require storage at low temperature due to the low boiling points of the ingredients: chlorine pentafluoride, $-18°$ C.; perchloryl fluoride, $-47.5°$ C. (both boiling points given for a pressure of 760 millimeters of mercury). Moreover, care should be exercised in handling the mixtures to prevent corrosive damage to equipment or injury to personnel.

As previously mentioned, any of the perhalogenyl fluorides

where X is the heptavalent radical of chlorine, bromine, or iodine alone or in admixture with each other are suitable for the oxidizers of the invention. However, because it provides superior performance in the way of specific impulse and the like, perchloryl fluoride is the preferred member of the group.

The actual preparation of the liquid oxidizers is simple, requiring only that the ingredients be mixed together in the desired proportions and at a suitably low temperature. Although there is nothing critical about this particular temperature range and a higher or lower temperature can be employed, temperatures of $-60°$ C. to $-50°$ C. are completely satisfactory. The main object is to use a sufficiently low temperature to reduce losses of the ingredients through vaporization. Obviously, increased pressure can also reduce such losses during mixing as well as in storage. The increased pressure also permits the use of higher mixing and storage temperatures if desired.

The oxidizers require no special rocket engine hardware and can be employed in the same manner as those conventional oxidizers now in use. Thus, chlorine pentafluoride-perhalogenyl fluoride mixtures can be used in lieu of such oxidizers as red fuming nitric acid, dinitrogen tetraoxide, and the like in hybrid-fueled rocket engines or in liquid propellant engines.

Another aspect of the present invention concerns preferred fuel and oxidizer combinations to be used in an improved method of operating hybrid-propellant rocket engines. As previously explained, the presence of both oxygen and fluorine in the oxidizer composition makes it suitable for use with any of the solid fuel compositions used with hybrid-propellant engines. Generally, these solid fuel compositions are substantially identical to the solid propellant compositions used with solid propellant engines except that the oxidizer is eliminated. For example, hybrid-propellant fuels can consist of a single grain made by curing a liquid polymer in a suitable mold, generally the combustion chamber of the hybrid-fueled engine itself. Polyurethanes, polyethers, polyesters, polyenes, and polysulfides are among the polymeric materials which can be cured and used as fuels. In addition to the polymer and whatever curing agents, cross-linking agents, and the like necessary to cure the polymer, the fuel composition can also contain burning rate catalyst such as ferrocene, Milori blue, copper chromite, ferric oxide, and carbon black as well as high energy fuels such as lithium, lithium hydride, boron, magnesium, aluminum hydride, aluminum, and others. Examples of how these and other fuels can be prepared are given in the following U.S. Pats. Nos. 3,017,260; 3,005,692; 3,003,861; 3,002,830; 2,992,908; 2,952,530. As previously mentioned, all that is required to adopt these compositions to use in hybrid-fueled rocket engines is that the oxidizer incorporated in the prior art solid propellant grains be omitted.

The preferred solid fuels are the cured, intimate mixtures of at least one of the group lithium hydride, aluminum, and aluminum hydride powders and an organic polymer of the hydrocarbon conjugated dienes of four to six carbon atoms and their halogen substituted analogs containing from four to six carbon atoms per molecule as exemplified by the polymers 1,3-butadiene, isoprene, chloroprene, 1,3-pentadiene, and 2,3-dimethyl-1,3-butadiene; copolymers of these hydrocarbon conjugated dienes with each other; copolymers of these conjugated dienes with 2,3-bis(difluoroamino)propyl acrylate or other unsaturated difluoroamino substituted compounds of up to about six carbon atoms; polymers of 2,3-bis(difluoroamino)propyl acrylate, polymers of the ethylenically unsaturated aliphatic hydrocarbon carboxylic acids (i.e.

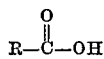

where R is an ethylenically unsaturated aliphatic hydrocarbon group) of up to about eight carbon atoms per molecule of acid and their lower alkyl esters such as acrylic acid, methacrylic acid, ethacrylic acid, vinyl acrylic acid, 2-ethyl-3-propyl acrylic acid, and the methyl and ethyl esters of these acids; copolymers of these unsaturated acids or their esters with each other; copolymers of these unsaturated carboxylic acids or their esters with 2,3-bis(difluoroamino)propyl acrylate and other unsaturated difluoroamino substituted compounds of up to about six carbon atoms; and finally, copolymers of these unsaturated carboxylic acids or their esters with the conjugated dienes and their halogen substituted analogs of up to about six carbon atoms. The two most preferred class of fuels are the cured, intimate mixtures of at least one of the group lithium hydride, aluminum, and aluminum hydride powder and a binder selected from poly 2-3-bis(difluoroamino)propyl acrylate and the copolymers of butadiene and acrylic acid with those fuels containing aluminum powder being the most preferred fuels.

In the preferred solid fuel grains of the invention, the organic binder constitutes from about 10% by weight to about 90% by weight of the fuel grain with the metal and/or metal hydride powder being about 10% by weight to about 90% by weight of the fuel grain. Preferably, the fuel grain will consist essentially of about 20% by weight to about 55% by weight of polybutadiene-acrylic acid copolymer as a binder and from about 45% by weight to about 80% metal or metal hydride powder. The metal or metal hydride powder will normally vary in particle size from about 325 mesh to about 20 mesh.

The solid fuel grains are prepared according to conventional techniques. The metal or metal hydride powder is added with thorough mixing to the liquid prepolymer along with any burning rate modifiers, curing agents, crosslinking agents, and the like. The mixture is then poured into a suitable mold and allowed to cure thus forming a solid, cured intimate mixture of the binder and metal or metal hydride powder. As mentioned before, the percentage by weight given for the polymeric binder is the solid fuel grain is intended to include whatever conventional curing agents, crosslinking agents, catalyst, and the like which are added to the polymer to cause it to cure. The fuel grain will normally be cylindrical in shape and may or may not have internal perforations.

In the operation of a hybrid-fueled rocket engine according to the present invention, the solid fuel grain is rigidly positioned in the combustion chamber of the engine and the liquid oxidizer injected into the chamber through any conventional type injector such as those employed in liquid-fueled engines or other hybrid-fueled engines. The oxidizer is directed towards the grain. The injector atomizes and/or vaporizes the liquid oxidizer to facilitate the combustion process. Ignition is achieved according to routine techniques such as with a slug-hypergol start where spontaneous ignition is achieved by simultaneously injecting an amine and red fuming nitric acid into the chamber. Upon ignition, the liquid oxidizer is introduced into the chamber to support combustion of the grain. When combustion of the grain is initiated, the acid-amine flow is halted. Other suitable means for ignition include igniting a butane-air mixture in the chamber to start combustion of the grain. Various squib igniters can also be used.

The solid fuel grain can be rigidly positioned in the combustion chamber simply by curing the grain in the chamber in the desired position or the grain can be coated with an adhesive and placed in the chamber in contact with the chamber walls. Furthermore, ordinary mechanical means can be used to secure the grain in position.

The amount of oxidizer to be injected into the chamber to support combustion of the solid grain in hybrid-fueled rocket engines should be from about 0.8 to about 1.2 times the stoichiometric amount, the stoichiometric amount being that necessary to furnish sufficient oxygen to convert the carbon to carbon monoxide and the metals to the corresponding metal oxide (for example, aluminum to $Al_2O_3$). Obviously, the actual composition of the fuel grain and the particular oxidizer mixture will determine what constitutes the stoichiometric amount or ratio of oxidizer to fuel for any given fuel-oxidizer combination. However, the composition of both the fuel grain and the oxidizer will be known in any given application of the invention and the optimum ratio can be determined by calculations and actual tests. The range of 0.8 to 1.2 times the stoichiometric amount gives a starting point from which such optimum amounts can be determined for any given combination of fuel, chlorine pentafluoride-perhalogenyl fluoride mixture, and particular rocket engine. For best results, perfluoryl chloride should be used as the perhalogenyl fluoride which is in admixture with chlorine pentafluoride in the oxidizer.

Illustrative of the preferred class of fuels and oxidizers to be used in the improved method for the operation of hybrid-fueled rocket engines according to the present invention are those given in the table below.

TABLE.—Fuel, Oxidizer Combinations

| | Fuel composition, percent by weight | | | | Oxidizer mixture, percent by weight | |
|---|---|---|---|---|---|---|
| Number | PBAA[1] | AlH₃ | Al | LiH | ClO₃F | ClF₅ |
| 1 | 53.3 | 46.7 | | | 14.3 | 85.7 |
| 2 | 53.3 | 46.7 | | | 28.6 | 71.4 |
| 3 | 53.3 | 46.7 | | | 57.2 | 42.8 |
| 4 | 53.3 | 46.7 | | | 71.5 | 28.5 |
| 5 | 53.3 | 46.7 | | | 85.8 | 14.2 |
| 6 | 53.3 | | 46.7 | | 14.3 | 85.7 |
| 7 | 53.3 | | 46.7 | | 28.6 | 71.4 |
| 8 | 53.3 | | 46.7 | | 42.9 | 57.1 |
| 9 | 53.3 | | 46.7 | | 57.2 | 48.8 |
| 10 | 53.3 | | 46.7 | | 71.5 | 28.5 |
| 11 | 53.3 | | 46.7 | | 85.6 | 14.2 |
| 12 | 23.0 | | | 77.0 | 23.0 | 77.0 |

[1] PBAA designates polybutadiene-acrylic acid copolymer.

The specific impulse of these combinations ranges generally from about 245 seconds to about 290 seconds which places hybrid-fueled rocket engines operated according to the method of the invention comparable to the liquid and solid propellant engines now in use.

Fuel grains made poly-2,3-bis (difluoroamino) propyl acrylate wherein the polybutadiene-acrylic acid copolymer of the fuel compositions in the table is replaced by poly-2,3-bis(difluoroamino) propyl acrylate give similar specific impulses.

These fuel grains are manufactured according to the standard techniques known in the art. A particularly useful method of preparation is given in U.S. Pat. No. 3,002,830.

The difluoroamino compounds contemplated by the present invention are prepared by the addition reaction of tetrafluorohydrazine to an ethylenically unsaturated compound according to the general reaction:

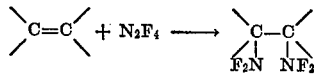

The reaction temperature can vary from 40° C. to about 150° C. with subatmospheric pressures to super-atmospheric pressures, generally in the range of about one-eighth atmosphere to about five atmospheres. A stoichiometric excess of tetrafluorohydrazine is desirable. For example, allyl alcohol is reacted with tetrafluorohydrazine by slowly adding tetrafluorohydrazine to the alcohol over a period of several hours at reduced pressure while maintaining the temperature of the reaction mass at about 100° C. in an oil bath. The 2,3-bis(difluoroamino)propyl alcohol thus produced is reacted with acryloyl chloride according to the standard techniques for synthesizing esters of alkenoic acids to produce 2,3-bis(difluoroamino) propyl acrylate.

The above detailed description of the invention is for the purpose of illustration only and the scope of the invention is not intended to be limited thereby except in accordance with the appended claims.

We claim:

1. An oxidizing composition consisting essentially of a mixture of chlorine pentafluoride and a perhalogenyl fluoride of the formula

wherein X is a member selected from the group consisting of the heptavalent radical of chlorine, bromine, and iodine, the ratio of said chlorine pentafluoride to said perhalogenyl fluoride in parts by weight being from about 1.0:10.0 to about 10.0:1.0.

2. An oxidizing composition consisting essentially of a mixture of chlorine pentafluoride and perchloryl fluoride, the ratio of said chlorine pentafluoride to said perchloryl fluoride in parts by weight being from about 1.0:10.0 to about 10.0:1.0.

3. In the method of operating hybrid-propellant rocket engines wherein a fluid oxidizer is introduced into the combustion chamber of said engine to support the combustion of a solid fuel disposed in said chamber, the improvement which comprises substituting for said fluid oxidizer a mixture of chlorine pentafluoride and a perhalogenyl fluoride of the formula

wherein X is a member selected from the group consisting of the heptavalent radical of chlorine, bromine, and iodine, the ratio of said chlorine pentafluoride to said perhalogenyl fluoride in parts by weight being from about 1.0:10.0 to about 10.0:1.0.

4. In the method of operating hybrid-propellant rocket engines wherein a fluid oxidizer is introduced into the combustion chamber of said engine to support the combustion of a solid fuel disposed in said chamber, the improvement which comprises substituting for said fluid oxidizer a mixture of chlorine pentafluoride and perchloryl fluoride, the ratio of said chlorine pentafluoride to said perchloryl fluoride in parts by weight being from about 1.0:10.0 to about 10.0:1.0.

5. The method of operating a hybrid-fueled rocket engine, said method comprising bringing together and igniting in the combustion chamber of said engine a solid fuel and an oxidizer, said fuel grain consisting essentially of a cured, intimate mixture of about 10% by weight to about 95% by weight of a polymer selected from the group consisting of polymers of the hydrocarbon conjugated dienes containing four to six carbon atoms per molecule of diene, copolymers of the hydrocarbon conjugated dienes of four to six carbon atoms per molecule with each other, copolymers of the hydrocarbon conjugated dienes of four to six carbon atoms with 2,3-bis(difluoroamino)propyl acrylate, polymers of 2,3-bis(difluoroamino)propyl acrylate, polymers of the ethylenically unsaturated aliphatic hydrocarbon carboxylic acids of up to about eight carbon atoms, polymers of the lower alkyl esters of the ethylenically unsaturated aliphatic hydrocarbon carboxylic acids of up to about eight carbon atoms, copolymers of the ethylenically unsaturated aliphatic hydrocarbon carboxylic acids of up to eight carbon atoms with each other, copolymers of the ethylenically unsaturated aliphatic hydrocarbon carboxylic acids of up to eight carbon atoms with the lower alkyl esters of these acids, copolymers of the ethylenically unsaturated hydrocarbon carboxylic acids of up to about eight atoms with the hydrocarbon conjugated dienes of 4 to 6 carbon atoms, and copolymers of the lower alkyl esters of the ethylenically unsaturated aliphatic hydrocarbon carboxylic acids of up to about eight carbon atoms with the hydrocarbon conjugated dienes of 4 to 6 carbon atoms, and from about 10% by weight to about 90% by weight of at least one of the group consisting of powdered aluminum, aluminum hydride, and lithium hydride, said oxidizer consisting essentially of a mixture of a perhalogenyl fluoride of the formula

and chlorine pentafluoride, the ratio by weight of perhalogenyl fluoride to chlorine pentafluoride being from about 1.0:10.0 to about 10.0:1.0, where X is selected from the group consisting of the heptavalent radical of chlorine, bromine, and iodine.

6. The method of operating a hybrid-fueled rocket engine, said method comprising bringing together and igniting in the combustion chamber of said engine a solid fuel and an oxidizer, said fuel consisting essentially of about 10% by weight to about 90% by weight of polybutadiene-acrylic acid copolymer and from about 10% by weight to about 90% by weight powdered aluminum, said oxidizer consisting essentially of a mixture of perchloryl fluoride and chlorine pentafluoride, the weight ratio of perchloryl fluoride to chlorine pentafluoride being from about 1.0:10.0 to about 10.0:1.0.

7. The method according to claim 6 wherein powdered aluminum hydride is substituted for said powdered aluminum.

8. The method according to claim 6 wherein powdered lithium hydride is substituted for said powdered aluminum.

References Cited

UNITED STATES PATENTS 3,068,641   3/1962   Fox _____ 60—35.4

OTHER REFERENCES

Kit and Evered Rocket Propellant Handbook, The Macmillan Co., New York, 1960 pp. 80 and 89–96.

BENJAMIN R. PADGETT, Primary Examiner

U.S. Cl. X.R.

60—219; 149—1, 19, 20, 109